METHOD FOR PREPARING ELECTROLUMINESCENT LIGHT SOURCES

Filed Jan. 12, 1966

United States Patent Office 3,459,603
Patented Aug. 5, 1969

3,459,603
METHOD FOR PREPARING ELECTROLUMINESCENT LIGHT SOURCES

Leonard R. Weisberg, Princeton, and Albrecht G. Fischer, Trenton, N.J., assignors, by mesne assignments, to the United States of America as represented by the Secretary of the Air Force Filed Jan. 12, 1966, Ser. No. 520,190
Int. Cl. H01l 7/00
U.S. Cl. 148—1.5 4 Claims

ABSTRACT OF THE DISCLOSURE

A method of fabricating electroluminescent light source utilizing a strong source of radiation to promote the formation of electroluminescent p-n junction in group II–VI semiconductor materials. The source of radiation may be light, gamma rays, high energy electrons, neutrons, etc. The intensity of the irradiation should be strong enough to flood the crystal with holes and elecgroup II–VI semiconductor materials. The source of 700–1000° C., and the radiation is continued until the sample has cooled to below 200–300° C.

Figures 1, 2:
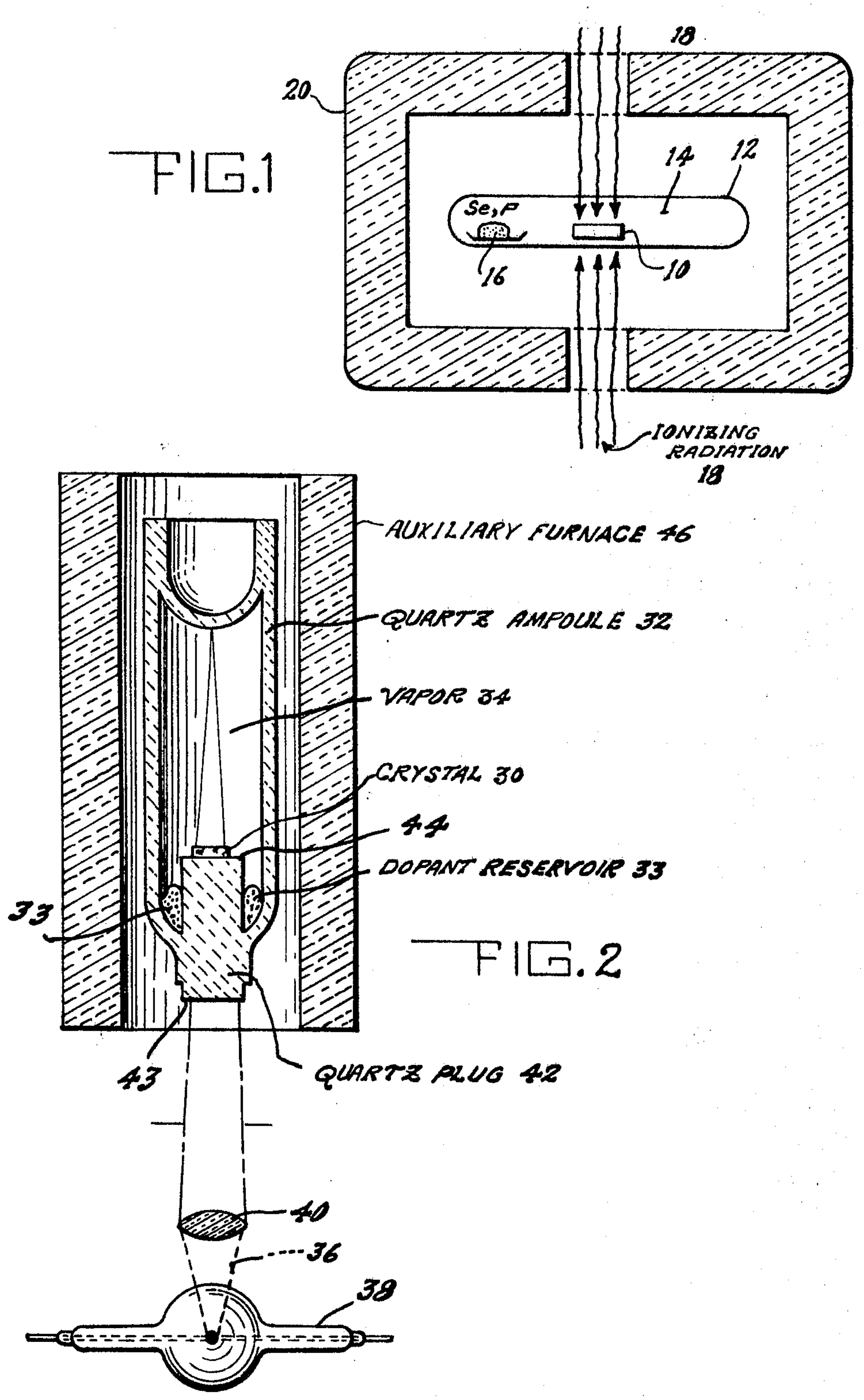

This invention relates to solid state light sources, and more particularly to a method for preparing electroluminescent light sources.

Injection electroluminescent light sources are based on radiative recombinaton of electrons and holes in forward-biased p-n junctions. For emission in the visible spectral range such light sources have been prepared using SiC, GaAs-GaP alloys and GaP host crystals. The known devices based on these materials have several disadvantages. The SiC light sources, even though their emission color can cover the whole visible spectral range, are of very low efficiency ($10^{-5}$) due to the fact that SiC has an "indirect" bandgap and is plagued by polytypism. The GaAs-GaP alloy light sources are very efficient because they have a "direct" bandgap below 40% GaP content, but they are limited to emission in the red spectral range due to the smallness of the bandgap. GaP light sources can emit red and green light but the efficiency is not high due to the "indirect" bandgap of GaP. ZnTe-ZnSe alloy light sources are efficient but limited to red emission due to the smallness of the bandgap.

In contrast, the compounds which would be very well suited for emission in the visible spectral range are the II–VI compounds especially ZnS, CdS and ZnSe. Their bandgaps are both large enough and are "direct." In fact, they are the best known luminescent materials. These materials can be made highly n-type conducting, but their drawback is that they cannot, up to this date, be made highly p-type conducting. Therefore, useful p-n junctions have heretofore not been made using these compounds as host crystals.

Accordingly, a principal object of the present invention is to provide a new method by which these II–VI compound materials can be rendered p-type, thus enabling fabrication of p-n junctions useful for efficient solid state light sources emitting throughout the visible spectral range.

To properly understand the invention, it is appropriate to first consider the reason why compounds such as ZnS, CdS, and ZnSe, for example, refuse to become p-type when normal methods of doping are used. As soon as the p-type impurity (e.g. group I*b* or group V*b* ion) enters a lattice site, a strong electronic interaction can occur that causes an anion-vacancy to be created. Each vacancy acts as a donor impurity, and releases an electron. Each electron can make a transition to the p-type impurity and this releases more energy than the energy required to form the vacancy. Hence, the vacancy will form. (The exact mechanism of this energy transfer is not yet known, nor is it relevant here.)

In the present invention, the crystal is irradiated with intense, strongly ionizing radiation such as: light of a suitable wavelength, gamma rays, high energy electrons, neutrons, etc. The intensity of this irradiation should be strong enough to flood the crystal with holes and electrons to a concentration comparable to or exceeding the concentration of p-type impurities. The irradiation then prevents the above-mentioned electrons released by anion vacancies to remain combined with the holes from the p-type impurities, and thereby cancels out the strong electronic interaction. Hence, the vacancy formation will be suppressed and the sample can be made p-type.

Other objects, advantages and features of the instant invention will become more apparent from the following description when read in conjunction with the attached drawings, the scope of the invention being defined by the appended claims.

In the accompanying drawings:

FIGURE 1 is a sectional view of one embodiment of this invention illustrating the principle of photo-uncompensation of wide gap semiconductors; and FIGURE 2 is a sectional view of a second preferred embodiment of this invention.

Now referring to FIGURE 1, one starts out with a host crystal 10 which has the p-type dopant already incorporated, but is compensated by vacancies, so that it is of very high electrical resistance. The task is to remove the compensating vacancies.

Crystal 10 is heated in sealed quartz glass ampoule 12 in a pressurized atmosphere 14 of its anion component 16 while it is exposed to intense ionizing radiation 18. If gamma radiation is used, ampoule 12, including a small surrounding furnace 20 is either inserted into a nuclear reactor (not shown) or is brought very close to a port of the nuclear reactor. The beam density should be as high as possible. The advantage of gamma radiation is that it penetrates the whole volume of crystal 10, converting it to p-type. Since partial reconversion to n-type is easy, n-type surface layers can be later produced on the p-type crystal. The temperature is about 800–1000° C. to permit rapid emigration of anion vacancies. The required time depends, among other factors, on the size of crystal 10. It is important that radiation 18 is kept on while crystal 10 is left to cool down. Only if the temperature is below 200–300° C. may radiation 18 be removed.

Now referring to FIGURE 2, an undoped ZnSe crystal 30 is sealed into a quartz glass vessel 32 containing an atmosphere 34 of selenium and phosphorus vapor emanating from dopant reservoirs 33. As in the previous embodiment, the selenium vapor has the function of suppressing the formation of Se vacancies as much as possible. The phosphorus vapor has the function of diffusing into crystal 30 and acting as acceptor center. To prevent compensation by selenium vacancies at the firing temperature of 700–1000° C. by means of auxiliary furnace 46, intense light 36 from a high power incandescent or mercury arc lamp 38 is focussed by lens 40 onto crystal 30 through the walls of quartz plug 42 as illustrated in FIGURE 2. Quartz plug 42 shown in FIGURE 2 is specially shaped, having polished parallel end faces 43 and 44, to permit efficient light transfer to crystal 30. The optical power absorbed by crystal 30 is on the order of 100 watts per $cm.^2$ in the spectral range causing ionization of the fundamental lattice and of electronic centers. Unwanted parts of the lamp spectrum such as the infrared can be removed by suitable filters (not shown). The acceptor impurities are diffused into crystal 30 while the crystal is illuminated. This may take several day of continuous operation since phosphorus is a slow diffusor.

It is also possible to start with a crystal which already contains the dopant but in compensated form, and to remove the compensating vacancies by the combined thermal and light treatment described as example two. Since vacancies diffuse several orders of magnitude faster than group V acceptor ions, the time of the treatment can be considerably shorter, on the order of one hour. In either case, light is kept on until crystal has cooled to a temperature where lattice diffusion processes are negligible.

This method using light has the drawback that it is difficult to uncompensate the whole volume of the crystal due to the strong absorption of the light. Only a surface layer is affected by the treatment. However this method has the advantage that uncompensation in the surface layer is more complete than using gamma ray irradiation alone because the light also dissociates the selenium vapor molecules into the monatomic species which is more active filling selenium vacancies in the crystal. Of course one can combine light and gamma ray irradiation simultaneously and thus obtain volume uncompensation plus monatomic selenium vapor.

It is evident that the theory herein presented can be extended to fabricate many other solid state light sources. For example, a phosphorus doped ZnSe single crystal wafer is made p-type conducting by heating in selenium vapor containing 1% phosphorus vapor while the crystal is simultaneously irradiated with light and/or gamma rays. After recovering the crystal from the sealed quartz vessel, a p-n junction is then formed by alloying a dot of indium onto the crystal by rapid heating of the dot to 300° C. in argon. A wire is soldered to the indium dot, and an evaporated gold film serves as contact to the p-type ZnSe crystal. If a forward bias of a few volts is applied to the resulting light diode, it emits visible light in the p-n junction region.

It should also be noted that this invention is not restricted to II–VI compounds, but is applicable to any high bandgap material in which such impurity-defect interactions occur. Also, the application of the principle embodied in this invention is not limited to the fabrication of only electroluminescent light sources, but is also applicable to the fabrication of p-n junction devices in general, including transistors and rectifiers.

Accordingly, it will be obvious to those skilled in the art that various changes of modifications may be made without departing from the invention, and it is therefore intended, in the appended claims, to cover all such changes and modifications as fall within the true spirit and scope of the invention.

We claim:

1. The method of fabricating electroluminescent light sources comprising the steps of: heating a host crystal to 700–1000° C. in a pressurized atmosphere comprising anion components of said crystal, said host crystal being a wide bandgap, semiconductor, II–VI compound material containing a p-type dopant, simultaneously exposing said host crystal to intense light of suitable wavelength which will prevent compenstion of vacancies; and cooling said host crystal while continuing exposure of said crystal to said light of suitable wavelength until said host crystal has cooled to a temperature of less than 200–300° C.

2. The method as described in claim 1 wherein said pressurized atmosphere is heated to a temperature of about 800–1000° C.

3. The method of fabricating electroluminescent light sources comprising the steps of: heating a host crystal to 700–1000° C. in a pressurized atmosphere comprising anion components of said crystal and a p-type dopant, said host crystal being a wide bandgap, semiconductor, II–VI compound material, simultaneously exposing said host crystal to intense light of suitable wavelength which will prevent compensation of vacancies, and cooling said host crystal while continuing exposure of said crystal to said light of suitable wavelength until said host crystal has cooled to a temperature of less than 200–300° C.

4. The method as described in claim 3 wherein said host crystal is ZnSe, and said pressurized atmosphere comprises selenium vapor and phosphorus vapor, said selenium vapor suppressing the formation of Se vacancies and said phosphorus vapor diffusing into said crystal and acting as acceptor center.

References Cited

UNITED STATES PATENTS

| | | | |
|---|---|---|---|
| 2,666,814 | 1/1954 | Shockley | 317—235 |
| 2,750,541 | 6/1956 | Ohl | 148—1.5 XR |
| 2,842,466 | 7/1958 | Moyer | 148—1.5 |
| 3,200,018 | 8/1965 | Grossman | 148—174 XR |
| 3,293,084 | 12/1966 | McCaldin | 148—1.5 |
| 3,341,754 | 9/1967 | Kellett et al. | 317—234 |
| 3,383,567 | 9/1968 | King et al. | 148—1.5 XR |

L. DEWAYNE RUTLEDGE, Primary Examiner

PAUL WEINSTEIN, Assistant Examiner

U.S. Cl. X.R.

117—93; 148—13, 186, 189; 252—62